Figure 1:
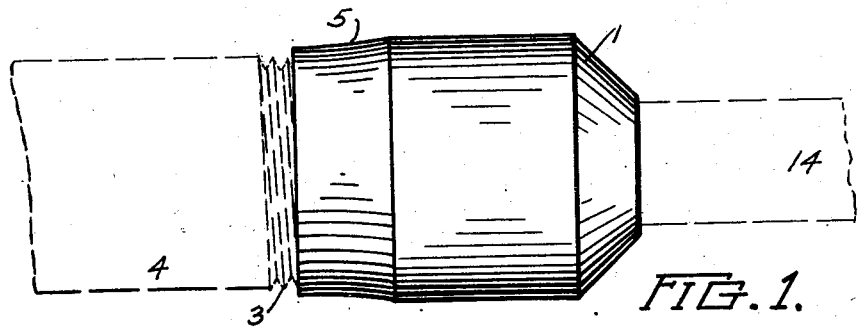

April 18, 1939.   M. A. ELLIOTT   2,155,008
FLEXIBLE ADAPTER COUPLING
Filed July 5, 1938

Inventor
MORRIS AUBREY ELLIOTT.
By Howard J. Whelan.
Attorney

Patented Apr. 18, 1939

2,155,008

UNITED STATES PATENT OFFICE 2,155,008

FLEXIBLE ADAPTER COUPLING

Morris Aubrey Elliott, Baltimore, Md.

Application July 5, 1938, Serial No. 217,507

2 Claims. (Cl. 285—87)

This invention refers to pipe fittings and more particularly to a device for connecting soft-material piping to hard-material piping. It has among its objects to provide a device of this kind that will have the following features:

(1) A flexible shoulder to permit the adaption of the shell of the connection to suit the surface contact of the connecting pipes with the shell;

(2) A series of ratchet cuts to keep the piping from turning after being connected;

(3) A suitable bolster for spreading the softer piping to better align same with the shell and make its surface contact non-leakable;

(4) To provide a cementless connection for piping.

Other objects will become apparent as the invention is more fully set forth.

In the applicant's copending application, he has outlined the construction of a connecting member which requires the use of a cement, and is used for similar purposes as this invention. However, in this invention, the purpose has been to provide a construction that will afford considerable adjustment to the device and thereby make it more effective to piping that is used, under greater pressures, and without the use of cement or other mediums for filling up the unevenness that the contact surfaces may have. The device is provided with a shoulder on the portion arranged for connection with the hard-material piping, which is flexible enough to permit the shell to stretch and adjust itself to the increased diameter of the pipe-thread being screwed into it. This allows the hard-material piping to enter the connector shell and exert full pressure on the case-hardened bolster to spread the enlarged funnel end of the softer piping, and make it contact the inner surface of the shell in a leak-proof manner. Without this flexibility, the ingoing hard material piping would bind and not provide the desired pressure for surface contact between the soft-material piping, the shell and the bolster, to make it leak proof. Even slight unevenness in the surfaces of the piping and shell are adjusted, under the pressure, to make the contact leak-proof in this device.

Figure 2:
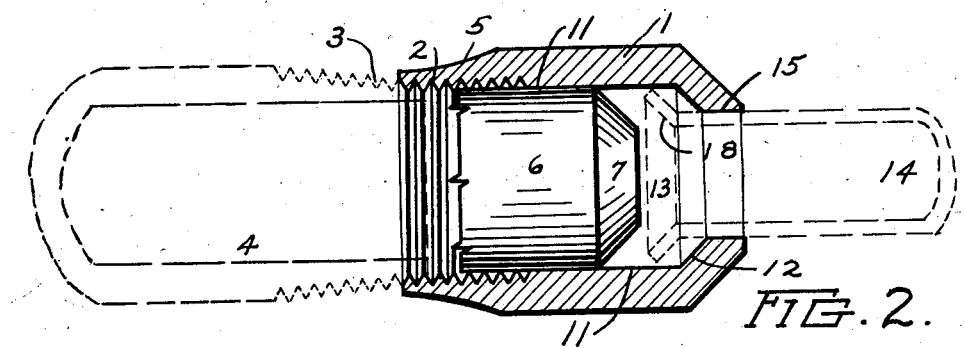
Figure 3:
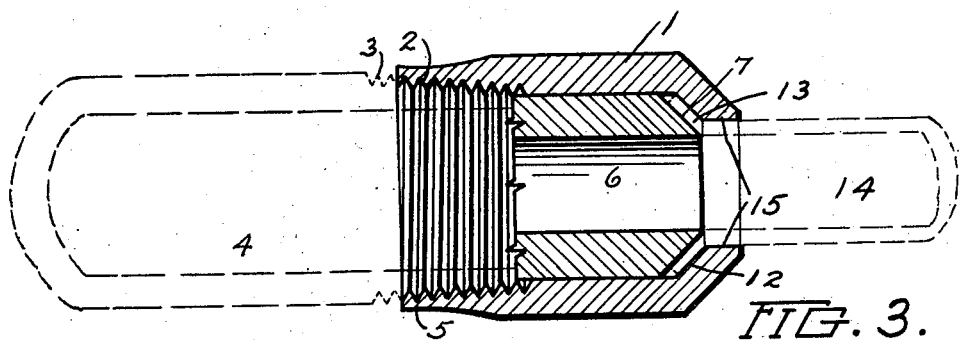
Figures 4, 5:
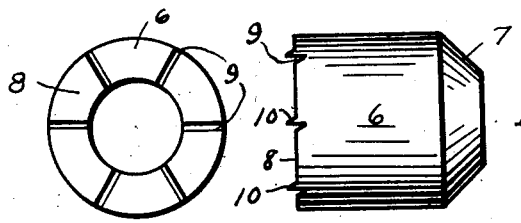

In the drawing, which illustrates an embodiment of this invention,

Figure 1 is a side view of the connector embodying this invention, and shown attached to piping that it connects together, Figure 2 is a longitudinal sectional view through the connector attached to piping, just inserted therein, and not drawn tightly up, Figure 3 is another sectional view taken longitudinally after the connector has been drawn-up tightly, Figure 4 is an end view of the connector at the bolster end.

Figure 5 is a side view of the bolster.

Similar reference characters refer to similar parts throughout the drawing.

In the drawing, the construction of the connector is arranged with the exterior shell 1, preferably of soft metallic material like brass or copper. The portion of the shell arranged for the hard-material piping is provided with an internal screw-threaded arrangement 2, to take the external screw thread 3 of a piece of piping 4 that screws into it. These screw threads are tapered in the conventional manner and therefore tend to spread the connector shell as they proceed more deeply into it. To take care of this spreading and allow the shell to adjust itself without splitting or binding, the shell end portion 5, is reduced in diameter to provide a concentric flexible shoulder. This shoulder is stretched out in diameter when the piping 4 is screwed deeply onto the shell, and until this piping has come into contact with a ratchet bolster 6. This ratchet bolster is preferably made of case-hardened steel with its internally disposed end portion 7 bevelled and the end external surface 8 radially cut at 9, to provide a series of slanting projecting fins 10. The shell 1 is provided with an internal passage 11 extending from the internal screw threaded portion 2 at one end to a bevelled reducing passage 12 at the other. This latter passage is adapted to take an enlarged funnel end portion 13 of the soft-material unthreaded tubing 14, and engage the peripheral surface of the same, while the bevelled portion 7 of the bolster engages the internal surface of the tubing 18. The bevel of the bolster and that of the casing are preferably parallel.

The soft-material tubing is inserted in the bevelled passage 12 so that its funnel portion 13 projects and fits into same. The bolster is inserted in the casing until its bevel portion 7, enters and fits the funnel. The hard material piping is then inserted and screwed into the threaded portion 2 until it contacts the surface 8 of the bolster 6. After that, the screwing of the piping 4 into the casing causes its screw threads to exert pressure on the shoulder portion 5 of the shell and spread same sufficiently to prevent binding. This also permits pressure to be exerted on the bolster and force its bevel portion 7 into the funnel portion 13 of the tubing 14. The more the piping 4 is screwed into the shell, the more the bolster squeezes the funnel 13 between its bevel 7 and the internal bevelled surface 12 of the shell, and thus makes it leak proof. At the same time, the shoulder 5, will give sufficiently to permit the piping 4 to enter without offering sufficient resistance to prevent its proper pressure on the bolster and incidently on the funnel portion 13. The fins 10 engage the end surface of the pipe 4 and cause the bolster to attach itself securely to it. This makes the bolster tie in with this piping and grind and fit itself into the funnel as the tightening pressure is exerted. The result is, the piping at each end connecting portion of the connector, are connected into a leak proof attachment. The adjustment of the shoulder 5 takes care of the piping 4 and the bevelled surfaces 7 and 12 for the tubing 14. The opening 15 is made sufficiently large to take the piping 14 which is funneled out after placement in the conventional manner. The adjustments just mentioned enable sufficient pressure to be brought to bear on all the surfaces through which there might be leakage, to prevent such leakage, and have enough such flexible adjustment to avoid splitting or breakage of the connector.

Particular attention is called to the arrangement of the shell portion that takes the hard-material piping or rigid pipe. The screw-threaded portion 2 is cut straight, and not tapered like that on the piping.

When the conventional rigid piping is inserted, the shoulder on the shell, which is constructed as indicated in the drawing, bends outwardly on a gentle curve. Actually the shell stretches in diameter with the outermost portion making the greater, somewhat like a funnel of curved contour. When this shoulder bends as described, it adjusts itself to the threads on the pipe entering, and provides a full contact therewith. This distributes the pressure on all the screw threads on the shell from the screw threads on the pipe.

If the internal screw threads on the shell were tapered, this pressure would not be distributed evenly on them, because the tapering on the pipe would allow only a few threads to make ample contact. The bevel on the bolster is preferably of large angular spread, to enable the pressure of bending the funnel in the soft piping to be distributed over the largest area feasible and practical. This angular spread should be preferably about an angle of 45 degrees. When the bolster is in place and the fins have clawed themselves into the rigid pipe, the turning of the shell proceeds without turning it. The bolster becomes stationary inside the shell while the other parts of the device rotate around it. The piping 4 is the cause of this because it is stationary in the wall or other fastening holding it, and holds the bolster likewise.

While but one form of the invention is shown in the drawing it is not desired to limit this application for patent to this particular construction, otherwise than limited by the prior art, as it is appreciated that other designs could be made that would use the same principles and come within the scope of the appended claims.

Having thus described the invention, what is claimed is:

1. A connector for attaching hard-material and soft tubing together, comprising in combination, a shell having an internal passage therethrough, one end portion of which is screw-threaded and the other end portion bevelled to a constricted opening, said shell having its screw-threaded portion rendered flexibly stretchable, a hollow bolster member adapted for insertion in the shell passage with one end portion bevelled similarly to the bevel of the shell for engaging tubing placed therein and tightening thereon, the other end portion of the bolster member being arranged to receive the end of piping threaded into the shell and be forced tightly on the tubing, and fins on the bolster member for locking the said piping thereto, and causing the said member to grind into the tubing as the piping is threaded therein.

2. A connector of the class described for connecting rigid pipe and soft tubing together, comprising in combination, a shell formed with a straight internal screw thread therein disposed at one end portion thereof for engaging the screw threads on the end portion of a piece of rigid pipe, the end portion of the shell on which its screw threads are formed being thinned to permit external movement and stretching when forced on the screw threads of the rigid pipe and thereby bind resiliently thereon to an adjustable degree, the other end portion of the shell being restricted inwardly to provide an internal and external bevel with a surface adapted to bear closely against the exterior surface of the wall of a piece of tubing to be connected, and a cylindrical intermediate portion between the said end portions of the shell with its internal surface and wall straight and smooth, a hollow bolster member disposed in said shell and of the proximate length of internal portion of the intermediate portion with its external surface smooth and straight to slide readily on the said internal portion, said bolster member having an extension piece extended to correspond and coact with the internal bevel of the shell and similarly bevelled to engage with the internal surface of the soft tubing so as to funnel the same and compress it tightly and securely between the shell and bolster extension, and slanting projecting fins on the surface of the other end portion of the bolster arranged to face the end surface of the rigid pipe and engage therewith and therein as the screw threads aforementioned are tightened and the extension piece compresses the funnel of the soft tubing, substantially as described.

MORRIS AUBREY ELLIOTT.